US012609211B2

(12) United States Patent  
Kim et al.

(10) Patent No.: US 12,609,211 B2  
(45) Date of Patent: Apr. 21, 2026

(54) METHOD FOR SOLIDIFYING RADIOACTIVE WASTE COMPRISING BORON, AND SOLID RADIOACTIVE WASTE FORMED THEREBY

(71) Applicant: POSTECH RESEARCH AND BUSINESS DEVELOPMENT FOUNDATION, Pohang-si (KR)

(72) Inventors: Byoung Kwan Kim, Daejeon (KR); Woo Yong Um, Yongin-si (KR); Jae Hyuk Kang, Gunsan-si (KR); Ju Hyeok Lee, Gwangju (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 226 days.

(21) Appl. No.: 18/024,827

(22) PCT Filed: Jun. 30, 2021

(86) PCT No.: PCT/KR2021/008307  
§ 371 (c)(1),  
(2) Date: Mar. 6, 2023

(87) PCT Pub. No.: WO2022/260207  
PCT Pub. Date: Dec. 15, 2022

(65) Prior Publication Data  
US 2024/0170172 A1 May 23, 2024

(30) Foreign Application Priority Data  
Jun. 11, 2021 (KR) ........................ 10-2021-0076131

(51) Int. Cl.  
*G21F 9/16* (2006.01)  
*C04B 14/10* (2006.01)  
(Continued)

(52) U.S. Cl.  
CPC ........... *G21F 9/165* (2013.01); *C04B 14/106* (2013.01); *C04B 18/0463* (2013.01); (Continued)

(58) Field of Classification Search  
None  
See application file for complete search history.

(56) References Cited

U.S. PATENT DOCUMENTS

2006/0211908 A1* 9/2006 Gong ..................... C04B 28/008  
588/1  
2011/0306486 A1* 12/2011 Dussossoy .............. C03C 3/089  
501/63

FOREIGN PATENT DOCUMENTS

JP S 59-18498 1/1984  
JP H 11-295487 10/1999  
(Continued)

OTHER PUBLICATIONS

Jinmo Ahn, Won-Seok Kim, Wooyong Um Development of metakaolin-based geopolymer for solidification of sulfate-rich HyBRID sludge waste, Journal of Nuclear Materials, vol. 518, pp. 247-255 (Year: 2019).*

(Continued)

*Primary Examiner* — Guinever S Gregorio  
(74) *Attorney, Agent, or Firm* — LEX IP MEISTER, PLLC

(57) ABSTRACT

The present invention relates to a method solidifying radioactive waste containing boron, The method includes (a) mixing the radioactive waste, metakaolin, fumed silica, potassium hydroxide, and water to generate a second mixture, in which the radioactive waste contains boron.

8 Claims, 3 Drawing Sheets

(51) Int. Cl.
    C04B 18/04         (2006.01)
    C04B 18/14         (2006.01)
    C04B 22/06         (2006.01)
    C04B 28/26         (2006.01)
    *C04B 111/00*       (2006.01)

(52) U.S. Cl.
    CPC .......... C04B 18/146 (2013.01); C04B 22/062
           (2013.01); C04B 28/26 (2013.01); *C04B*
           *2111/00784* (2013.01); *C04B 2111/00862*
                                 (2013.01)

(56)               References Cited

FOREIGN PATENT DOCUMENTS

| | | | |
|---|---|---|---|
| JP | 2017-207297 | 11/2017 | |
| KR | 10-0192126 | 6/1999 | |
| KR | 10-2020-0125129 | 11/2020 | |
| WO | WO-2005019130 A1 * | 3/2005 | ........... C04B 28/006 |

OTHER PUBLICATIONS

Mo et al.; KR20200125129A; translation provided by Google Patents, Nov. 2025.*

Kim, Byoungkwan, et al. "Solidification of Borate Waste Using Metakaolin-Based Geopolymer Waste Form." Abstracts of Proceedings of the Korean Radioactive Waste Society, Autumn, 2020, vol. 18(2) (Dec. 9, 2020) 176-177.

* cited by examiner

METHOD FOR SOLIDIFYING RADIOACTIVE WASTE COMPRISING BORON, AND SOLID RADIOACTIVE WASTE FORMED THEREBY

TECHNICAL FIELD

The present invention relates to a method of solidifying radioactive waste containing boron and a solidified radioactive waste formed thereby, and more particularly, to a method of solidifying radioactive waste containing boron using metakaolin and the like, and a solidified radioactive waste formed thereby, in order to solve the problem of the conventional solidification method using cement that negatively affects cement setting and a compressive strength of the solidified radioactive waste as a hydration reaction of cement is hindered by water-soluble boron contained in radioactive waste in disposing the radioactive waste by solidification.

BACKGROUND ART

In general, most of the reactor devices or equipment that should be used in nuclear power plants and disposed of at the end of their lifespan are contaminated with radioactive materials.

In this way, buildings, facilities, machinery, structures, etc., contaminated with radioactive materials may not be simply buried or incinerated, and should be treated in accordance with the provisions of the Atomic Energy Act and the Environment Act after undergoing volume reduction treatment such as decontamination and cutting to remove radioactive materials.

In accordance with these treatment provisions, non-fixed materials such as concentrated waste liquid, waste resin, and waste filters generated from nuclear power plants or high-radioactive materials may be solidified through solidifying materials such as cement (concrete), paraffin, asphalt, and polymers, and put into a storage drum in order to be safely stored in a fixed form.

Such radioactive waste is permanently disposed of in a radioactive waste disposal facility. In this case, it is important to perform stable solidification treatment so that fixed nuclides contained in the disposed radioactive waste do not leak into the nearby environment and it is common to stabilize medium-low level radioactive waste by solidifying the medium-low level radioactive waste using cement.

On the other hand, about 500-2,000 ppm of boric acid is added to a primary system in order to adjust the output of the reactor and control the reactivity during operation of a pressurized water reactor (PWR). A portion of the primary system cooling water is collected as a significant amount of liquid waste by sampling, boric acid concentration control, and leakage. Among the collected liquid waste, liquid waste having a radioactive level that may not be diluted or released is concentrated and dried using a concentrated liquid waste drying system (CWDS) installed in a nuclear power plant. The main components of dried concentrated liquid waste (borate waste) are $B_2O_3$ and $Na_2O$, and it is known that there is a difference in chemical composition depending on the operation characteristics of power plants.

The above-described concentrated liquid waste containing boron is classified as medium-low level radioactive waste and requires solidification disposal for structural stability and volume reduction. As described above, cement is widely used as a material for solidification disposal, which is known to be due to a simpler manufacturing process, higher understanding of materials, and higher economic feasibility than other solidification methods.

However, boron (B), the main component of the concentrated liquid waste, interferes with the hydration reaction of cement. As a result, the boron (B) has been reported as a cause of setting retardation and low compressive strength of cement.

Looking at the main reaction mechanism related to this, portlandite (Ca (OH) 2) formed by hydration reaction reacts with water to form a basic environment, and then borate is dissolved as $Ca^{2+}$ and $OH^-$ ion concentrations increase. As a result, calcium and boron are bonded to generate insoluble calcium borate on the cement surface. It is known that the generated calcium borate acts as a protective layer to prevent contact between cement and water, and blocks the hydration reaction of cement, thereby negatively affecting the setting and compressive strength of cement where a solidified radioactive waste is formed.

In order to solve the problem of the method of disposing of radioactive waste containing boron as a solidified radioactive waste, as described above, a method of solidifying the concentrated liquid waste using vitrification, paraffin, and polymer has been proposed. However, the solidification methods proposed so far have disadvantages such as low economic feasibility or requiring an additional process of processing waste. The vitrification requires high-temperature processes and equipment, and the paraffin may be prepared as a heterogeneous solidified radioactive waste due to the difference in polarity between inorganic and organic matters. In the case of polymers, an additional process of granulating the concentrated liquid waste is required.

Accordingly, in solidifying the radioactive waste containing boron, there is an urgent need for research on a solidifying method capable of producing a solidified radioactive waste having an efficient and strong compressive strength.

(Patent Document 1) KR10-2181217 B

DISCLOSURE

Technical Problem

In order to solve the problems of the related art, the present invention provides a method of solidifying radioactive waste capable of efficiently solidifying radioactive waste containing boron and maintaining high compressive strength of solidified radioactive waste, and a solidified radioactive waste formed thereby.

Technical Solution

To solve the conventional problem, according to the present invention, a method of solidifying radioactive waste includes (a) mixing the radioactive waste, metakaolin, fumed silica, potassium hydroxide, and water to generate a second mixture.

The radioactive waste may contain boron.

The (a) may include: (a-1) mixing the radioactive waste, the fumed silica, the potassium hydroxide, and the water to generate a first mixture; and (a-2) after the (a-1), mixing the metakaolin with the first mixture to generate the second mixture.

The (a-2) may proceed after the first mixture generated in the (a-1) is stirred for 10 to 14 hours.

A part by weight of boron may be 60 or more and a part by weight of sodium may be 10 or more based on 100 parts by weight of the radioactive waste.

A part by weight of the radioactive waste may be 8 to 15 based on 100 parts by weight of the second mixture.

A part by weight of the metakaolin may be 26 to 31 based on 100 parts by weight of the second mixture.

A part by weight of the potassium hydroxide may be 18 to 21 based on 100 parts by weight of the second mixture.

A part by weight of the fumed silica may be 14 to 16 based on 100 parts by weight of the second mixture.

A part by weight of the water may be 24 to 27 based on 100 parts by weight of the second mixture, and the water may be deionized water.

To solve the conventional problem, according to the present invention, a solidified radioactive waste may be prepared by the method of solidifying radioactive waste described above.

In the solidified radioactive waste, a molar ratio of a mole of silicon to a mole obtained by summing a mole of boron and a mole of aluminum may be 1.2 to 1.6.

In the solidified radioactive waste, the molar ratio of the mole of silicon to the mole obtained by summing the mole of boron and the mole of aluminum may be 1.45 to 1.55.

A method of treating radioactive waste includes: (b) mixing the radioactive waste, metakaolin, fumed silica, potassium hydroxide, and water to generate a second mixture, in which the radioactive waste may contain boron.

The (b) may include: (b-1) mixing the radioactive waste, the fumed silica, the potassium hydroxide, and the water to generate a first mixture; and (b-2) after the (b-1), mixing the metakaolin with the first mixture to generate the second mixture.

A part by weight of boron may be 60 or more and a part by weight of sodium may be 10 or more based on 100 parts by weight of the radioactive waste.

A part by weight of the radioactive waste may be 8 to 15 based on 100 parts by weight of the second mixture.

A part by weight of the metakaolin may be 26 to 31 based on 100 parts by weight of the second mixture.

A part by weight of the potassium hydroxide may be 18 to 21 based on 100 parts by weight of the second mixture.

A part by weight of the fumed silica may be 14 to 16 based on 100 parts by weight of the second mixture.

A part by weight of the water may be 24 to 27 based on 100 parts by weight of the second mixture, and the water may be deionized water.

Advantageous Effects

Due to the above-described problem solving means, it is possible to generate a solidified radioactive waste capable of maintaining a certain degree of compressive strength even in a state in which boron is contained in radioactive waste, and to solidify radioactive waste, which is concentrated liquid waste, more safely over a long period of time than in the related art.

BEST MODE

Hereinafter, a method according to the present disclosure will be described in detail with reference to the accompanying drawings. In this process, thicknesses of lines, sizes of components, and the like, illustrated in the accompanying drawings may be exaggerated for clearness of explanation and convenience. In addition, terms to be described below are defined in consideration of functions in the present disclosure and may be construed in different ways by the intention of users or practice. Therefore, these terms should be defined on the basis of the contents throughout the present specification.

Figure 1:
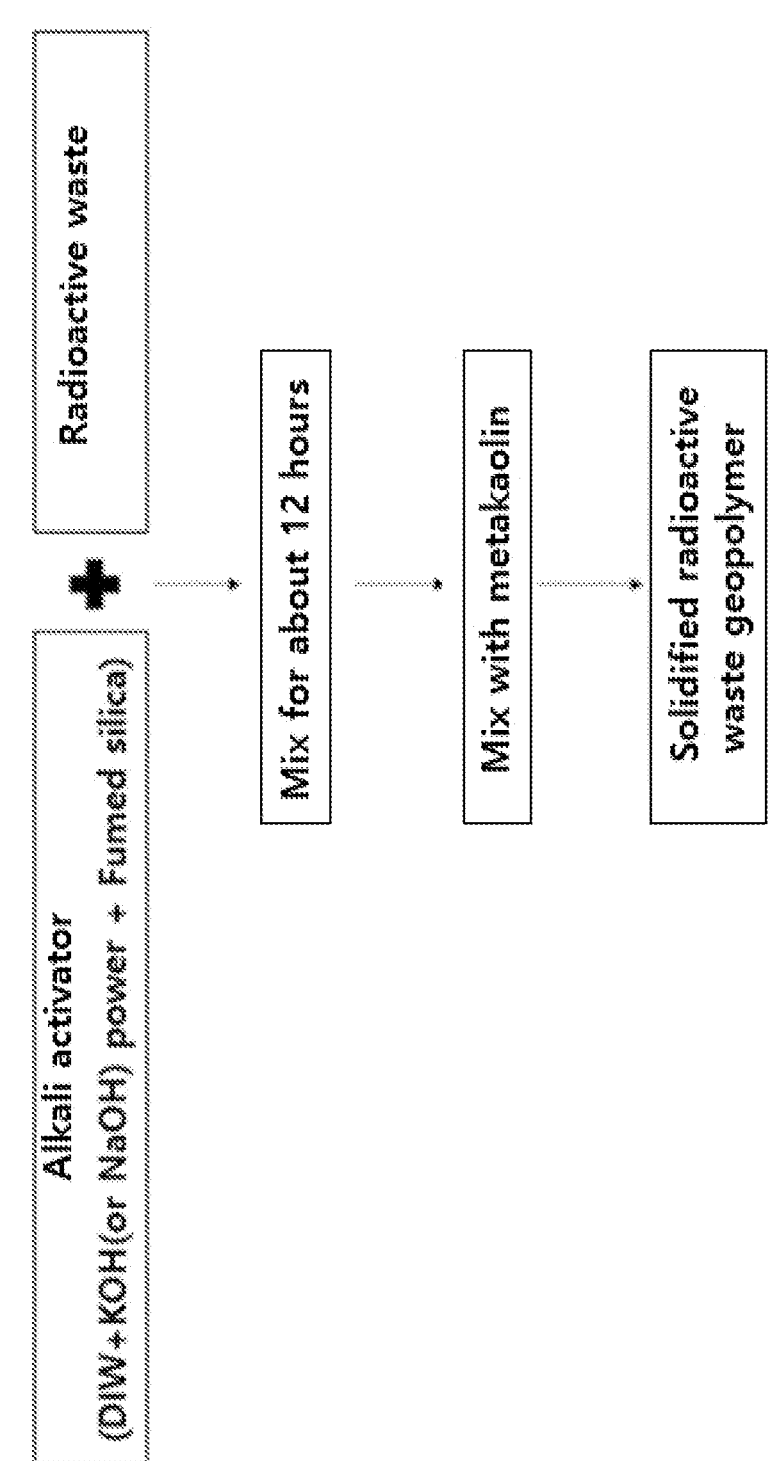
FIG. 1 is a diagram schematically illustrating a method of solidifying radioactive waste according to the present invention.

Referring to FIG. 1, a method of solidifying radioactive waste for solidifying radioactive waste containing boron will be described.

In the present invention, the solidified radioactive waste refers to being solidified in a state in which a solidifying material and radioactive waste are mixed. The present invention is to propose a method of preparing a solidified radioactive waste using metakaolin-based geopolymer.

The solidified radioactive waste was prepared using radioactive waste containing boron, deionized water (DWI), sodium hydroxide (NaOH), and fumed silica were used or using radioactive waste containing boron, deionized water (DWI), potassium hydroxide (KOH), and fumed silica.

The radioactive waste according to the present invention may be concentrated liquid waste in a powder form in which liquid waste containing boron as liquid waste generated from a reactor is concentrated and dried.

The metakaolin according to the present invention may be metakaolin having a main component of amorphous aluminosilicate and having 1% or less of calcium.

TABLE 1

| Molar ration of chemical composition of solidified radioactive waste | | Molar ratio of Si/(Al + B) | Parts by weight of radioactive waste |
|---|---|---|---|
| Solidified radioactive waste using | $Na_2O:(B_2O_3 + Al_2O_3):3.0SiO_2:9H_2O$ | 1.5 | 10 |
| sodium hydroxide alkali activator | $Na_2O:(B_2O_3 + Al_2O_3):2.8SiO_2:9H_2O$ | 1.4 | 12 |
| | $Na_2O:(B_2O_3 + Al_2O_3):2.6SiO_2:9H_2O$ | 1.3 | 15 |
| Solidified radioactive waste using | $(Na_2O + K_2O):(B_2O_3 + Al_2O_3):3.0SiO_2:9H_2O$ | 1.5 | 9 |
| potassium hydroxide alkali activator | $(Na_2O + K_2O):(B_2O_3 + Al_2O_3):2.8SiO_2:9H_2O$ | 1.4 | 12 |
| | $(Na_2O + K_2O):(B_2O_3 + Al_2O_3):2.6SiO_2:9H_2O$ | 1.3 | 14 |

TABLE 2

| Si/(Al + B) 1.5 | | | Si/(Al + B) 1.4 | | | Si/(Al + B) 1.3 | | |
|---|---|---|---|---|---|---|---|---|
| Feedstock | g | wt % | Feedstock | g | wt % | Feedstock | g | wt % |
| MK | 55.08 | 32.40% | MK | 52.04 | 30.61% | MK | 50.94 | 28.30% |
| Waste | 17.03 | 10.02% | Waste | 20.94 | 12.32% | Waste | 27.07 | 15.04% |
| Fumed silica | 28.71 | 16.89% | Fumed silica | 27.20 | 16.00% | Fumed silica | 27.56 | 15.31% |
| NaOH | 23.24 | 13.67% | NaOH | 23.17 | 13.63% | NaOH | 24.32 | 13.51% |
| Water | 45.93 | 27.02% | Water | 46.65 | 27.44% | Water | 50.11 | 27.84% |
| | | | | | | | | |
| Total | 170.00 | 100.00% | Total | 170.00 | 100.00% | Total | 180.00 | 100.00% |
| MK | 54.11 | 30.06% | MK | 50.63 | 28.13% | MK | 48.37 | 26.87% |
| Waste | 16.76 | 9.31% | Waste | 21.01 | 11.67% | Waste | 25.09 | 13.94% |
| Fumed silica | 28.22 | 15.68% | Fumed silica | 26.82 | 14.90% | Fumed silica | 25.51 | 14.17% |
| KOH | 36.20 | 20.11% | KOH | 36.14 | 20.08% | KOH | 33.89 | 18.83% |
| Water | 44.71 | 24.84% | Water | 45.40 | 25.22% | Water | 47.16 | 26.20% |
| | | | | | | | | |
| Total | 180.00 | 100.00% | Total | 180.00 | 100.00% | Total | 180.00 | 100.01% |

TABLE 3

| Si(Al + B) 1.5 | | |
|---|---|---|
| Feedstock | g | wt % |
| MK | 56.67 | 31.47% |
| Waste | 18.00 | 10.00% |
| Fumed silica | 29.66 | 16.48% |
| KOH | 51.05 | 28.36% |
| Water | 24.62 | 13.699% |
| | | |
| Total | 180.00 | 100.00% |

Table 1 shows the molar ratio of the chemical composition of the solidified radioactive waste prepared according to each case of Table 2, which shows a weight ratio of a chemical composition, and a weight ratio of the radioactive waste to a total weight of the solidified radioactive waste.

Table 2 shows the weight ratio of the chemical composition used to prepare the solidified radioactive waste corresponding to the Si/(Al+B) ratio in Table 1.

Table 3 for comparing the effect on the compressive strength of the solidified radioactive waste according to the weight ratio of the chemical composition shows the weight ratio of the chemical composition used to prepare the solidified radioactive waste with a Si/(Al+B) ratio of 1.5. The weight ratio of the chemical composition in Table 3 is a weight ratio with a certain degree of difference from the weight ratio of the chemical composition in Table 2 in that range.

1. Preparation of Alkali Activator

Preferentially, a sodium hydroxide alkali activator was prepared by mixing deionized water, sodium hydroxide (NaOH), and fumed silica so that the chemical composition of the solidified radioactive waste prepared was as shown in Table 1. In addition, a potassium hydroxide alkali activator was prepared by mixing deionized water, potassium hydroxide (KOH), and fumed silica so that the chemical composition of the solidified radioactive waste prepared was as shown in Table 1.

Furthermore, the alkali activators corresponding to the weight ratios in Table 3 were prepared.

2. Preparation of First Mixture and Third Mixture

Thereafter, the radioactive waste containing boron was added to each potassium hydroxide alkali activator so that the chemical composition of the prepared solidified radioactive waste was as shown in Table 1 to generate a first mixture, and then the first mixture was stirred at 25° C. for about 12 hours.

Similarly, the radioactive waste containing boron was added to each sodium hydroxide alkali activator so that the chemical composition of the prepared solidified radioactive waste was as shown in Table 1 to generate a third mixture, and then the third mixture was stirred at 25° C. for about 12 hours.

Similarly, the radioactive waste containing boron was added to the sodium hydroxide alkali activator in the weight ratio of Table 3 to generate a mixture, and then the mixture was stirred at 25° C. for about 12 hours.

The radioactive waste used in the experiment is simulated radioactive waste prepared by mixing reagents in accordance with the component ratio of actual radioactive waste.

3. Preparation of Second Mixture and Fourth Mixture

Next, the metakaolin was added to the potassium hydroxide alkali activator containing radioactive waste containing boron so that the chemical composition of the prepared solidified radioactive waste was as shown in Table 1 to generate a second mixture, and then a centrifugal mixer was used to stir the second mixture at 1800 RPM for about 2 minutes.

Similarly, the metakaolin was added to the sodium hydroxide alkali activator containing radioactive waste containing boron so that the chemical composition of the prepared solidified radioactive waste was as shown in Table 1 to generate a fourth mixture, and then a centrifugal mixer was used to stir the fourth mixture at 1800 RPM for about 2 minutes.

Similarly, the metakaolin is added to the sodium hydroxide alkali activator containing the radioactive waste containing boron in the weight ratio of Table 3 to generate a mixture, and then the centrifugal mixer was used to stir the fourth mixture at 1800 RPM for about 2 minutes.

4. Curing

Next, the second mixture and the fourth mixture were poured into a cylindrical mold having a diameter and ratio of 1:2. Thereafter, the second mixture and the fourth mixture were cured in an oven maintained at 60° C. for 6 days and then stored at room temperature for 1 day. Thereafter, compressive strength was measured after 7 days of age.

The same applies to the mixture generated by adding the metakaolin to the sodium hydroxide alkali activator containing the radioactive waste containing boron in the weight ratio of Table 3.

The weight ratio will be described.

In Table 2, Si/(Al+B) represents the mole of silicon to the mole obtained by summing the mole of boron and the mole of aluminum in the prepared solidified radioactive waste shown in Table 1.

In Table 3, Si/(Al+B) represents the mole of silicon to the mole obtained by summing the mole of boron and the mole of aluminum in the solidified radioactive waste prepared according to the weight ratio of Table 3.

As it is known that the content of silicon in the solidified radioactive waste has a great effect on the mechanical properties (including the compressive strength) of the solidified radioactive waste form, this is to review the compressive strength according to the case where the molar ratio of silicon may be changed based on the mole obtained by summing the mole of boron and the mole of aluminum.

In Table 1, sodium (Na) in the solidified radioactive waste using the potassium hydroxide alkali activator is sodium contained in the radioactive waste, not the alkali activator.

Further, the molar ratio of water to the mole obtained by summing the mole of boron and the mole of aluminum may be 9.

In addition, Table 2 shows the weight ratio of the chemical composition in the second mixture for preparing the solidified radioactive waste using the potassium hydroxide alkali activator and the weight ratio of the chemical composition in the fourth mixture for preparing the solidified radioactive waste using the sodium hydroxide alkali activator, in preparing each solidified radioactive waste.

The weight ratio of the solidified radioactive waste using the potassium hydroxide alkali activator is as follows.

The content of boron in the radioactive waste used may be 60 parts by weight or more based on 100 parts by weight of the radioactive waste, and the content of sodium in the radioactive waste used may be 10 parts by weight or more based on 100 parts by weight of the radioactive waste.

Preferably, a part by weight of the radioactive waste containing boron may be 8 to 15 based on 100 parts by weight of the second mixture.

Preferably, a part by weight of the metakaolin may be 26 to 31 based on 100 parts by weight of the second mixture.

Preferably, a part by weight of the potassium hydroxide may be 18 to 21 based on 100 parts by weight of the second mixture.

Preferably, a part by weight of the fumed silica may be 14 to 16 based on 100 parts by weight of the second mixture.

Preferably, a part by weight of water is 24 to 27 based on 100 parts by weight of the second mixture, and as described above, water may be deionized water.

The weight ratio of the solidified radioactive waste using the sodium hydroxide alkali activator is as follows.

The content of boron in the radioactive waste used may be 60 parts by weight or more based on 100 parts by weight of the radioactive waste, and the content of sodium in the radioactive waste used may be 10 parts by weight or more based on 100 parts by weight of the radioactive waste.

Preferably, a part by weight of the radioactive waste containing boron may be 9 to 16 based on 100 parts by weight of the fourth mixture.

Preferably, a part by weight of the metakaolin may be 28 to 33 based on 100 parts by weight of the fourth mixture.

Preferably, a part by weight of the sodium hydroxide may be 13 to 14 based on 100 parts by weight of the fourth mixture.

Preferably, a part by weight of the fumed silica may be 15 to 17 based on 100 parts by weight of the fourth mixture.

Preferably, a part by weight of water is 27 to 28 based on 100 parts by weight of the fourth mixture, and as described above, water may be deionized water.

The weight ratio of the solidified radioactive waste to compare the effect on the compressive strength of the solidified radioactive waste form according to the weight ratio is shown in Table 3. Similarly, the content of boron in the radioactive waste used may be 60 parts by weight or more based on 100 parts by weight of the radioactive waste and the content of sodium in the radioactive waste used may be 10 or more parts by weight based on 100 parts by weight of the radioactive waste.

Figure 2:
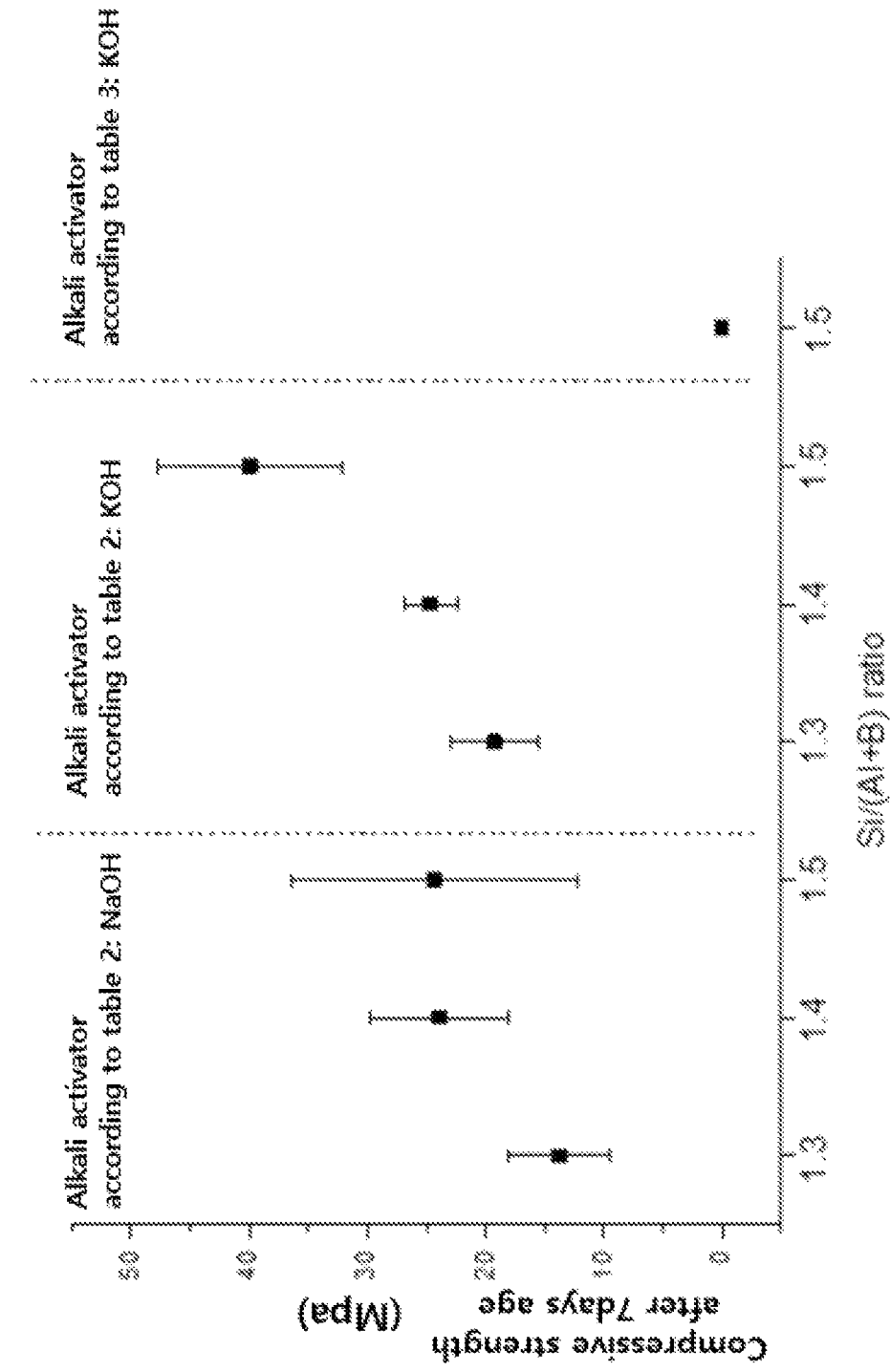
FIG. 2 is a diagram illustrating a compressive strength of a solidified radioactive waste prepared according to a weight ratio of each chemical composition in the method of solidifying radioactive waste according to the present invention.

Referring to FIG. 2, the compressive strength of each solidified radioactive waste will be described.

As described above, the compressive strength is the compressive strength after 7 days of age after pouring the second mixture and the fourth mixture into the cylindrical mold having a diameter and ratio of 1:2, curing the mixtures in an oven maintained at 60° C. for 6 days, and then storing the mixtures at room temperature for 1 day. The same goes for the mixture according to the weight ratio of Table 3.

In order to compare the compressive strength of solidified radioactive waste using the potassium hydroxide alkali activator and the compressive strength of solidified radioactive waste using the potassium hydroxide alkali activator, as shown in Table 1, the molar ratio of the aluminum and boron to the sodium in the solidified radioactive waste using the sodium hydroxide alkali activator was the same as the molar ratio of the aluminum and boron to the potassium in the solidified radioactive waste using the potassium hydroxide alkali activator.

The compressive strength of the solidified radioactive waste using the potassium hydroxide alkali activator was generally higher than that of the solidified radioactive waste using the sodium hydroxide alkali activator. Therefore, it can be seen that the solidified radioactive waste using the potassium hydroxide is more suitable than the case of using the sodium hydroxide as the alkali activator.

The compressive strength of the metakaolin-based geopolymer increases in proportion to the silicon content up to a specific silicon/aluminum ratio (1.9 to 2.1), which is known to be due to an increase in the Si—O—Si bond ratio.

It has been known that potassium, which has a larger ion size than sodium, is bonded with silicate oligomer with a long molecular chain to increase the connectivity of microstructures, thereby having a positive effect on the compressive strength.

Additionally, in the case of the solidified radioactive waste prepared according to the weight ratio of Table 3, the compressive strength is shown as 0.

That is, as it can be seen that there is a significant difference between the compressive strength of the solidified radioactive waste using the potassium hydroxide alkali activator according to Table 2 and the compressive strength of the solidified radioactive waste prepared according to Table 3, it can be seen that the compressive strength of the prepared solidified radioactive waste is changed depending on the weight ratio of the chemical composition.

In the case of the weight ratio of Table 3, the compressive strength is 0, indicating a state in which the solidified radioactive waste is not formed because the radioactive waste is not solidified. That is, in the case of the radioactive waste containing boron, when prepared within a certain range of weight ratios including the weight ratios of Table 3, it can be seen that the solidified radioactive waste is not generated because the radioactive waste is not solidified.

Figure 3:
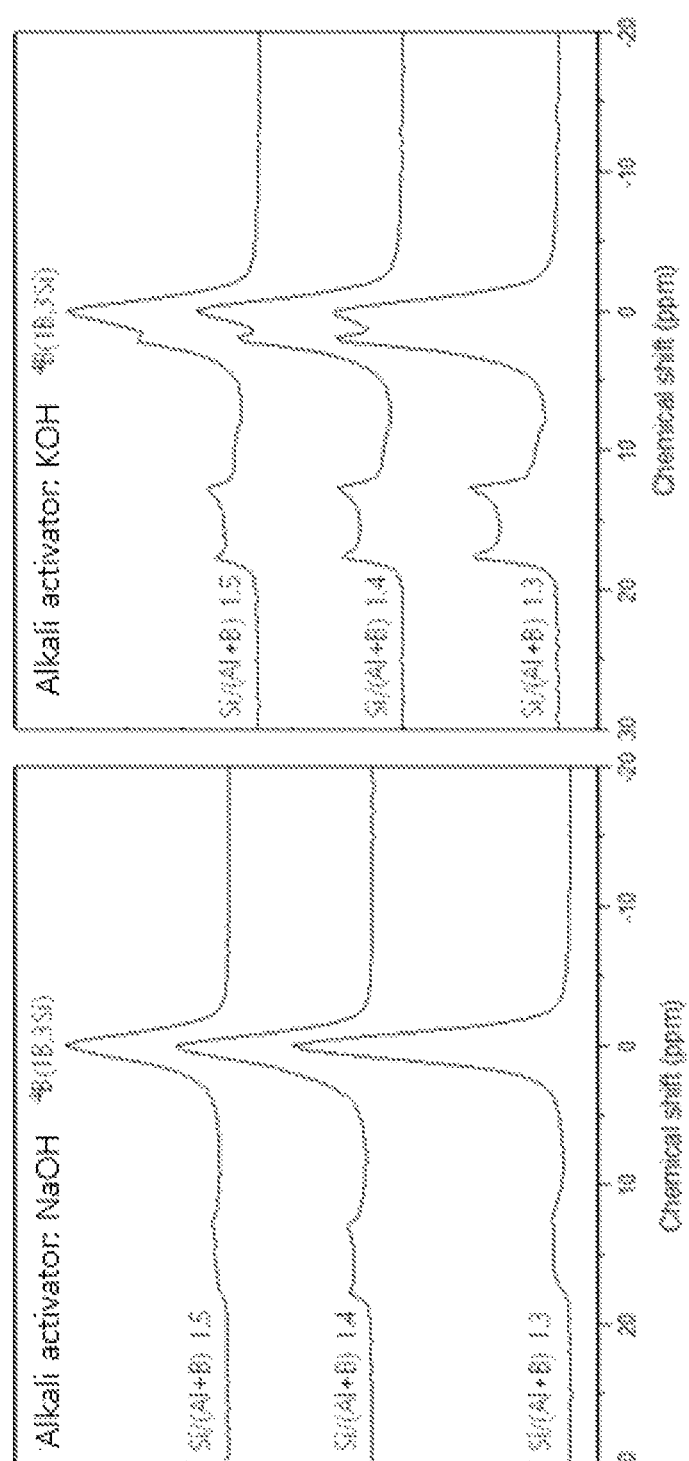
FIG. 3 is a result of 11B solid-state nuclear magnetic resonance analysis of a solidified radioactive waste prepared by the method of solidifying radioactive waste according to the present invention.

Referring to FIG. 3, the bonding structure of the boron and silicon included in the solidified radioactive waste will be described.

Regardless of the type of alkali activator, a [4]B (1B, 3Si) peak indicating boron and silicon bonding was found in all the solidified radioactive wastes, which means that boron, the main component of the radioactive waste, was bonded by substituting silicon in the geopolymer structure.

Hereinabove, the present specification has been described with reference to the embodiments illustrated in the drawings so that those skilled in the art can easily understand and reproduce the present invention, but this is only exemplary, and those skilled in n the art will understood that other embodiments equivalents variously modified from and equivalent to the embodiments of the present invention are possible. Therefore, the scope of protection of the present invention should be defined by the claims.

The invention claimed is:

1. A method of solidifying radioactive waste, comprising:
   (a) mixing the radioactive waste, metakaolin, fumed silica, potassium hydroxide, and water to generate a second mixture;
   wherein the radioactive waste contains boron, and
   wherein a part by weight of boron is 60 or more and a part by weight of sodium is 10 or more based on 100 parts by weight of the radioactive waste.

2. The method of claim 1, wherein the (a) includes:
   (a-1) mixing the radioactive waste, the fumed silica, the potassium hydroxide, and the water to generate a first mixture; and (a-2) after the (a-1), mixing the metakaolin with the first mixture to generate the second mixture.

3. The method of claim 2, wherein the (a-2) proceeds after the first mixture generated in the (a-1) is stirred for 10 to 14 hours.

4. The method of claim 1, wherein a part by weight of the radioactive waste is 8 to 15 based on 100 parts by weight of the second mixture.

5. The method of claim 1, wherein a part by weight of the metakaolin is 26 to 31 based on 100 parts by weight of the second mixture.

6. The method of claim 1, wherein a part by weight of the potassium hydroxide is 18 to 21 based on 100 parts by weight of the second mixture.

7. The method of claim 1, wherein a part by weight of the fumed silica is 14 to 16 based on 100 parts by weight of the second mixture.

8. The method of claim 1, wherein a part by weight of the water is 24 to 27 based on 100 parts by weight of the second mixture, and
   the water is deionized water.

* * * * *